United States Patent [19]

Meyer et al.

[11] Patent Number: 5,859,369

[45] Date of Patent: Jan. 12, 1999

[54] SNOWMOBILE DYNAMOMETER

[75] Inventors: Kevin R Meyer, Bozeman; Daniel W Keenan, Belgrade; Kenneth A Nevin, Three Forks, all of Mont.

[73] Assignee: Dynojet Research, Inc., Belgrade, Mont.

[21] Appl. No.: 920,784

[22] Filed: Aug. 29, 1997

[51] Int. Cl.$^6$ ........................................................ G01L 1/00
[52] U.S. Cl. ............................................ 73/862.09; 73/117
[58] Field of Search ............ 73/116, 117, 862.09–862.18

[56] References Cited

U.S. PATENT DOCUMENTS

| | | |
|---|---|---|
| 3,680,368 | 8/1972 | Warsaw . |
| 3,750,464 | 8/1973 | Ostrander ................................... 73/117 |
| 3,763,699 | 10/1973 | Sangster . |
| 3,982,428 | 9/1976 | Wilson . |
| 4,196,617 | 4/1980 | Leone, Sr. . |
| 4,246,779 | 1/1981 | Leone, Sr. . |
| 4,773,261 | 9/1988 | Cantrell ................................. 73/118.1 |
| 5,277,060 | 1/1994 | Lehman et al. . |
| 5,323,644 | 6/1994 | Schaefer ................................... 73/117 |
| 5,429,004 | 7/1995 | Cruickshank . |

*Primary Examiner*—R. Biegel
*Attorney, Agent, or Firm*—Allan Jacobson

[57] ABSTRACT

A dynamometer for a snowmobile includes a pair of driver wheels which replace the tension idler wheels so as to contact the inside of the snowmobile track. The regular snowmobile tension idler wheels are removed, and the driver wheels are positioned on the idler wheel axle. In the alternative, the dynamometer is attached to the existing tension idler wheels by a coupling plate. In the alternative embodiment, the tension idler wheels are configured for power take off by including pins forming a quick connect coupling mechanism. The quick connect coupling mechanism permits the dynamometer to be connected to the snowmobile without having to remove and replace the tension idler wheels with a different pair of driver wheels. A jack is provided to lift the snowmobile track clear of the ground by applying a lifting force between the ground and the tension idler wheel axle. The dynamometer and jack are integrated so as to share common components.

11 Claims, 6 Drawing Sheets

SNOWMOBILE DYNAMOMETER

FIELD OF THE INVENTION

The present invention relates to the field of dynamometers. In particular, the present invention relates to the dynamometers useful for testing snowmobiles, also known as sleds.

BACKGROUND OF THE INVENTION

A dynamometer is a diagnostic test instrument that measures power and torque as a function of speed, either in terms of revolutions per minute (rpm) at the engine or clutch, or in terms of ground speed. The power output accelerates an inertia flywheel, typically a steel drum with a known mass. Sensors from the engine and flywheel are coupled to a computer to compute the output power and torque. Data on engine speed, flywheel speed and environmental inputs are collected. The data, together with the known moment of inertia of the flywheel, is used in a known engineering formula for the calculation of power plant performance including horsepower and torque. The typical computed measurement output of a dynamometer is a pair of graphs showing output horsepower versus engine or clutch rpm (or ground speed) and output torque versus engine or clutch rpm (or ground speed).

There are two types of dynamometers: an engine dynamometer and a chassis dynamometer. An engine dynamometer measures the output of the engine alone, while a chassis dynamometer measures output at the driven wheels.

To use an engine dynamometer, the engine is removed from the vehicle, mounted on a test bench, and coupled to the dynamometer. Some vehicle designs permit an in-chassis dynamometer test by providing for partial disassembly in order to access the engine output. Engine dynamometers present several problems. For one, there is the difficulty of removing an engine from a vehicle, and then reinstalling the engine in the vehicle after the test. Even for an in-chassis test, there is the difficulty of partial disassembly and reassembly. Furthermore, engine characteristics alone do not represent a complete picture of vehicle performance. Problems with drive chains, transfer cases and the like, are not evident from an engine dynamometer run. Other components in the power train, such as the clutch, transmission, and wheels greatly affect the ultimate characteristics of the vehicle. In the case of a snowmobile, an engine dynamometer test would not uncover any problems with the drive lines, chains, clutch transfer case or track. In contrast to an engine dynamometer, a chassis dynamometer measures the output at the driven wheels of a motor vehicle. A chassis dynamometer takes into account the effect of the drive train and engine together. Chassis dynamometers for automobiles and motorcycles are known. In a chassis dynamometer, the drive wheel or wheels of the vehicle are placed on top of the dynamometer so that each driven tire contacts an inertia flywheel which is directly accelerated in a dynamometer run. The vehicle is secured by its non-drive wheel or wheels. Some dynamometers use a pair of wheels to cradle the driven wheel(s) of the test vehicle. A chassis dynamometer for snowmobiles would present special problems because the track of a snowmobile does not easily drive the smooth surface of the flywheel.

SUMMARY OF THE INVENTION

It is desirable to provide a chassis dynamometer which is capable of attachment to the snowmobile track. The present invention is embodied in a chassis dynamometer for snowmobiles. The unique features of the present dynamometer are seen in the manner in which the dynamometer is coupled to the sled. In prior art dynamometers, the vehicle sits directly on the rotating mass that is accelerated. Snowmobile tracks have paddles that push the snow during normal use. The paddles cannot grip the relatively smooth surface of the drum and accelerate it as do car and motorcycle tires. The present snowmobile dynamometer is different from prior art dynamometers in that the vehicle does not sit directly on the rotating mass that is accelerated.

In particular, to attach the snowmobile to the inertia mass, two driver wheels are positioned to contact the track. The driver wheels have recesses which match and mesh with the shape of the snowmobile track. Each driver wheel is then coupled to the dynamometer drum via a sprocket wheel and chain arrangement. In the case where the driver wheel contacts the outside of the track, the driver wheel matches the outside paddles. Since paddles on the outside of the track may be different for different snowmobiles, a different matching driver wheel may be required for each particular type of track.

On the inside of the snowmobile track, there are raised protrusions, or tabs, which are uniformly spaced and designed to transfer power to the snowmobile drive track. In the case where the driver wheel contacts the inside of the track, the driver wheel matches the tabs on the inside of the track. Since there is an industry standard for the inside surface of snowmobile tracks, the same driver wheels are capable of coupling the dynamometer to all sleds produced by the major snowmobile manufacturers which adhere to the same track standard.

In a preferred embodiment, the dynamometer is attached to the inside of the track of the snowmobile. The snowmobile track travels around four tension idler wheels, which are located two on each side, at the rear of the snowmobile. To attach the snowmobile to the dynamometer, the two outside tension idler wheels are removed. The removed tension idler wheels exposes the tension idler wheel axle. Then, two driver wheels of the dynamometer are attached in place of the removed tension idler wheels by slipping them over the exposed tension idler wheel axle. The installed driver wheels have flanges forming recesses which match and mesh with the tabs in the inside of the snowmobile track.

In an alternative embodiment, the tension idler wheel may be subsequently modified or originally designed for power take off by including a coupling mechanism. For example, a plurality of pins are added to the snowmobile idler wheel construction. Then, a coupler forms a quick connect and disconnect mechanism for coupling the dynamometer to the snowmobile by slipping the coupler over the pins. In another alternative embodiment, a coupling mechanism can be specifically designed to contact an existing tension idler wheel without modification of the tension idler wheel. In either case, the dynamometer is attached to the snowmobile without having to remove and replace the tension idler wheels with a different pair of driver wheels.

In accordance with another aspect of the present invention, the snowmobile is supported above the ground by a snowmobile jack. In the preferred embodiment, the axle of the tension idler wheels is extended by the driver wheels outwardly from each idler wheel, beyond the chassis of the snowmobile. The extended tension idler wheel axle is contacted by bearing surfaces, one on each side of the snowmobile. The snowmobile jack lifts the rear of the snowmobile off the ground by transmitting its lifting force between the ground and the bearing surfaces of the tension idler wheel axle. The snowmobile jack is integrated with the snowmobile dynamometer by sharing common components, such as the driver wheels and the supporting frame holding the mechanical power coupling components extending from the driver wheels. In particular, the snowmobile jack provides a screw drive member which contacts the ground at one end. A traveling bolt positioned on the screw drive member is coupled to the supporting frame of the sprocket wheel and chain arrangement. Force exerted between the ground and the supporting frame is transmitted to the bearing surface of the tension idler wheel axle, which lifts the rear of the snowmobile off the ground. In an elevated position, with the snowmobile jack extended, the front runners of the snowmobile are in contact with the ground and the snowmobile track is clear of ground interference. The snowmobile is ready for a dynamometer run.

DETAILED DESCRIPTION

Figure 1:
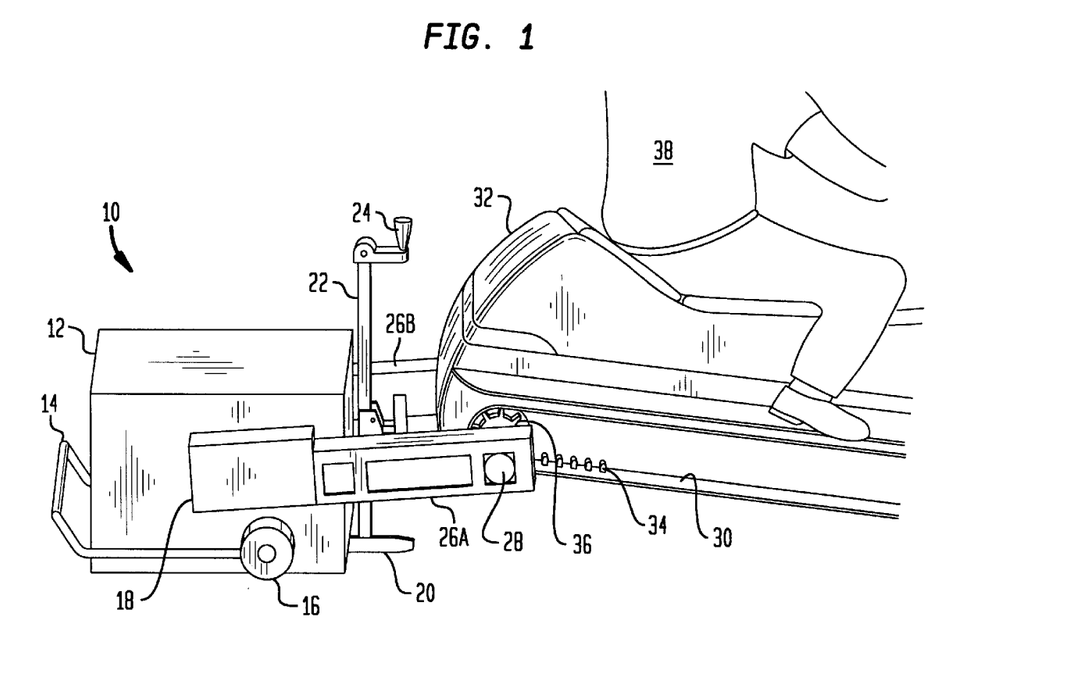
FIG. 1 is a drawing of a dynamometer in accordance with the present invention attached to a snowmobile during a dynamometer run.

FIG. 1 shows an operator 38 on a snowmobile 32, attached to a dynamometer 10 during a dynamometer run. The dynamometer 10 comprises a housing 12, mounted on wheels 16 with a handle 14, which facilitate moving the dynamometer 10 into position. The dynamometer 10 further includes a pair of swing arms 18, one on each side of the housing 12. Each swing arm 18 includes a frame 26A, 26B, containing a telescoping assembly 28 and driver wheel 36. The driver wheel 36 engages tabs 34 on the inside of the snowmobile track 30. The dynamometer further includes a jack assembly 20, 22, 24 for lifting one end of the snowmobile off the ground.

The dynamometer jack assembly comprises a cylindrical support column 22 attached at one end to crank handle 24, and at the other end to pressure foot 20, which is in contact with the ground. The jack assembly is shown in an extended position in which the rear end of snowmobile 32 is lifted off the ground so that the snowmobile track 30 is clear of ground interference. The front runners (not shown) at the other end of the snowmobile 32, rest on the ground in a secure position. In this elevated position, operator 38 accelerates the snowmobile 32 to complete a dynamometer run.

Figure 2:
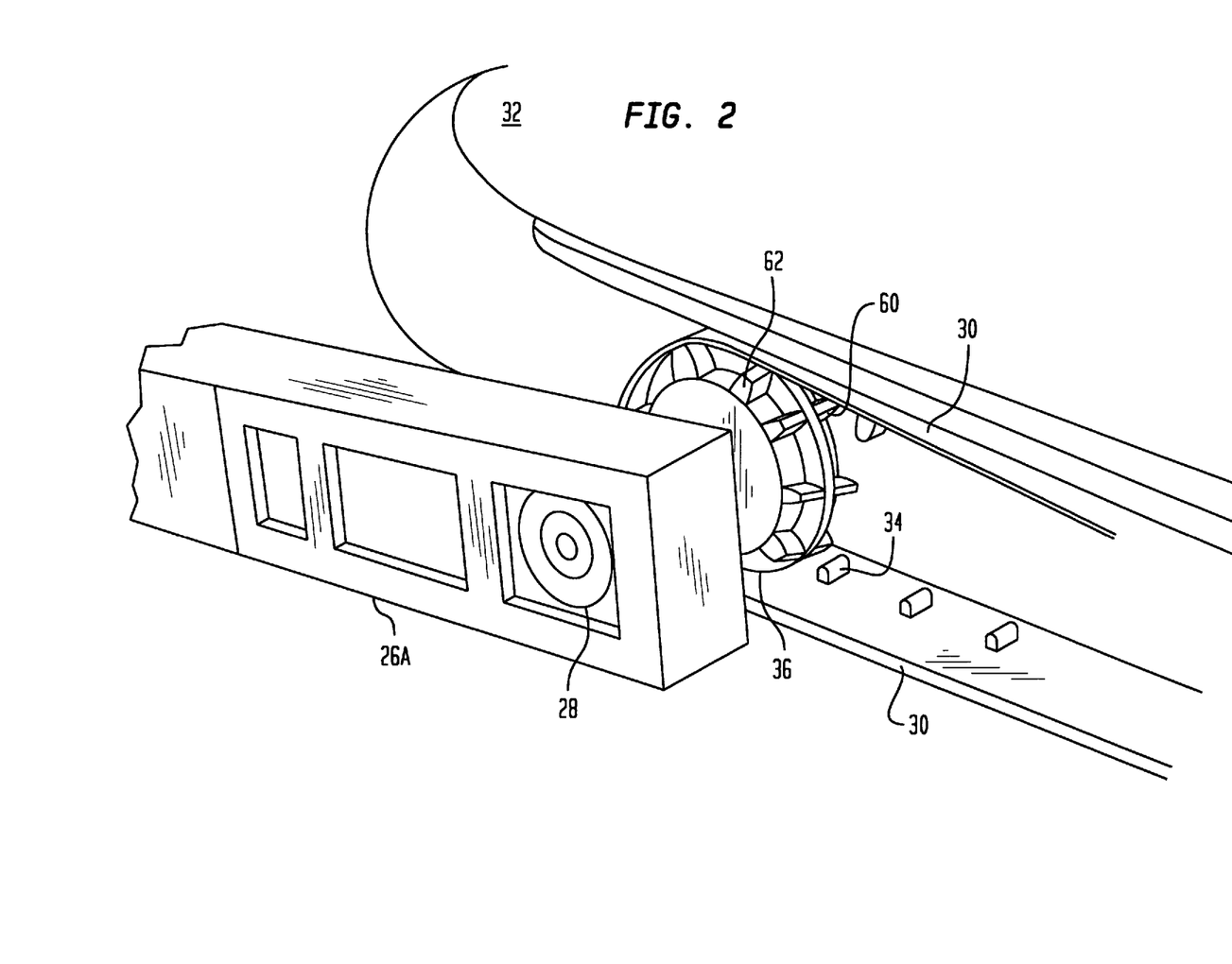
FIG. 2 is a detail drawing of the coupling between the snowmobile and a dynamometer, in accordance with the present invention.

FIG. 2 is a isometric detail view of the driver wheel 36 engaging tabs 34 on the inside of the snowmobile track 30. The driver wheel 36 is extended into place by operation of telescoping assembly 28. Frame 26A supports the telescoping assembly 28 and driver wheel 36. Driver wheel 36 has flanges 60 on the inside, and also has flanges 62 on the outside, relative to the snowmobile. Only the inside flanges 60 engage the tabs 34. The track 30 also has additional rows of tabs (not shown), which are normally used for power transfer to the track, by powered driver wheels at the front and middle of the snowmobile (not shown).

Figure 2A:
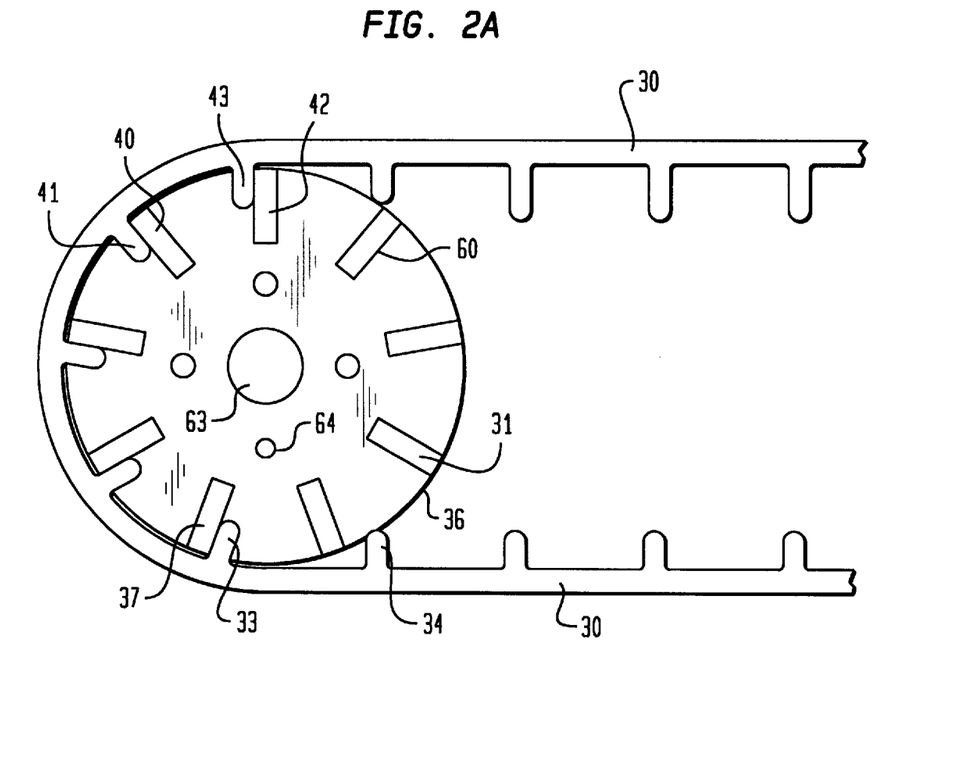
FIG. 2A is a cross sectional view of the coupling between the snowmobile and a dynamometer, in accordance with the present invention.

The engagement between driver wheel 36 and track 30 is shown with further detail in cross sectional view in FIG. 2A. Driver wheel 36 includes a plurality of flanges 31, 37, 40, 42. As can be seen in FIG. 2A, individual tab 41 contacts flange 40, while individual tab 43 contacts flange 42. The powered track 30 first engages the driver wheel 36 via tab 33 engaging flange 37. Driver wheel 36 further includes pins 64 and a circular bearing surface 63. The circular bearing surface 63 slides over the tension idler wheel axle of the snowmobile. The pins 64 engage a coupler (discussed below in conjunction with the coupler 44 of FIG. 3) which couples the driver wheel 36 to the telescoping assembly (indicated as reference 28 in FIG. 2).

Figure 2B:
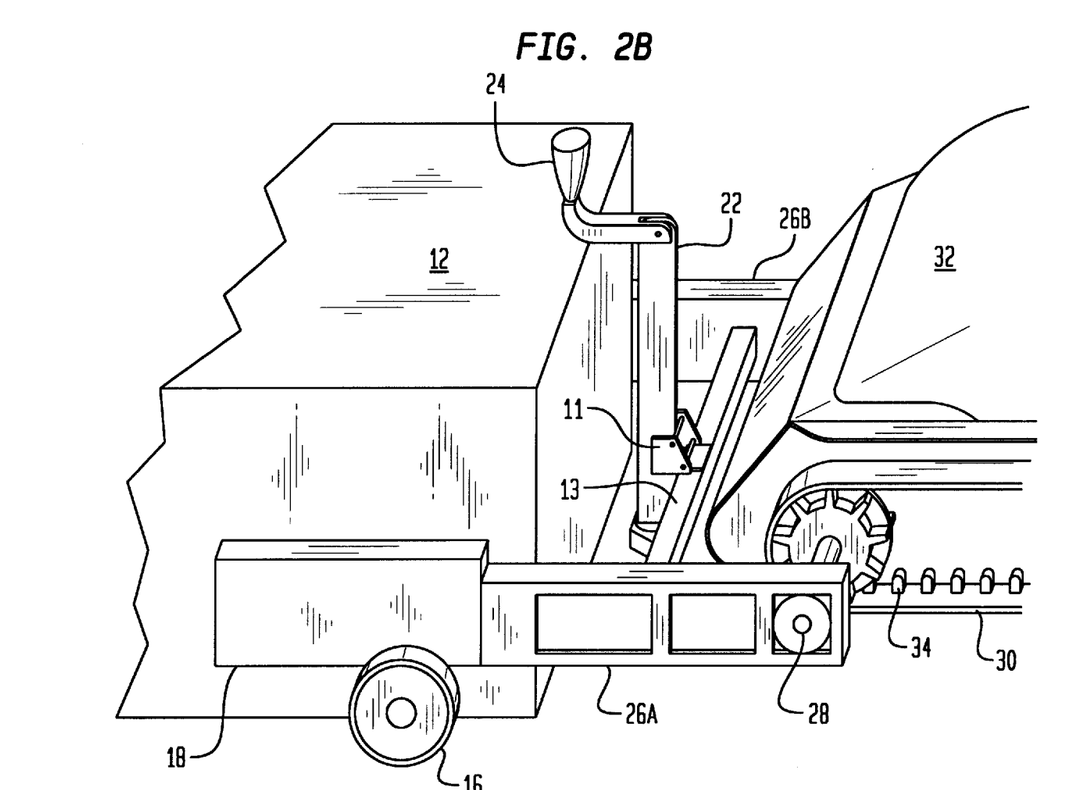
FIG. 2B is a detail drawing of the snowmobile jack in accordance with the present invention.

FIG. 2B is a detail drawing of the snowmobile jack for lifting the track 30 of the snowmobile 32 clear of the ground. In particular, cylindrical support column 22 contains a screw drive member inside. Coupled to the internal screw drive is a rigid member 11 which travels up and down as the internal screw member rotates. The rigid member 11 is coupled to a cross beam 13, which in turn is fastened to frames 26A and 26B.

The snowmobile 32 is resting on the ground in FIG. 2B. To jack up the snowmobile, the crank handle 24 is turned by hand, which rotates the internal screw member within cylindrical support column 22, raising rigid member 11 and cross beam 13. The resulting upward force on frame 26A (and frame 26B) causes swing arm 18 to rotate about is mounting on housing 12. As both swing arms on either side of housing 12 rotate upward, the force and resulting motion is transmitted through the telescoping assembly 28 and through driver wheel 36 to the bearing surface (63 in FIG. 2A) which contacts the tension idler wheel axle of the snowmobile, thereby lifting the snowmobile by its rear axle. The process is reversed by rotating crank handle 24 in the reverse direction which lowers the snowmobile to the ground after the dynamometer run.

Any one of a number of other mechanisms may be substituted for the particular jack arrangement show which produces an upward force on the bearing surface of the tension idler wheel axle. For example, a scissor jack with horizontal screw member may be used to raise cross beam 13. Housing 12 may be raised by a jack, if rigidly mounted swing arms are used in lieu of rotating swing arms 18. Any arrangement by which an upward force is applied to the bearing surface of the tension idler wheel axle will lift the snowmobile clear of the ground, thus permitting it to operate its track for the purpose of conducting a dynamometer run.

Figure 3:
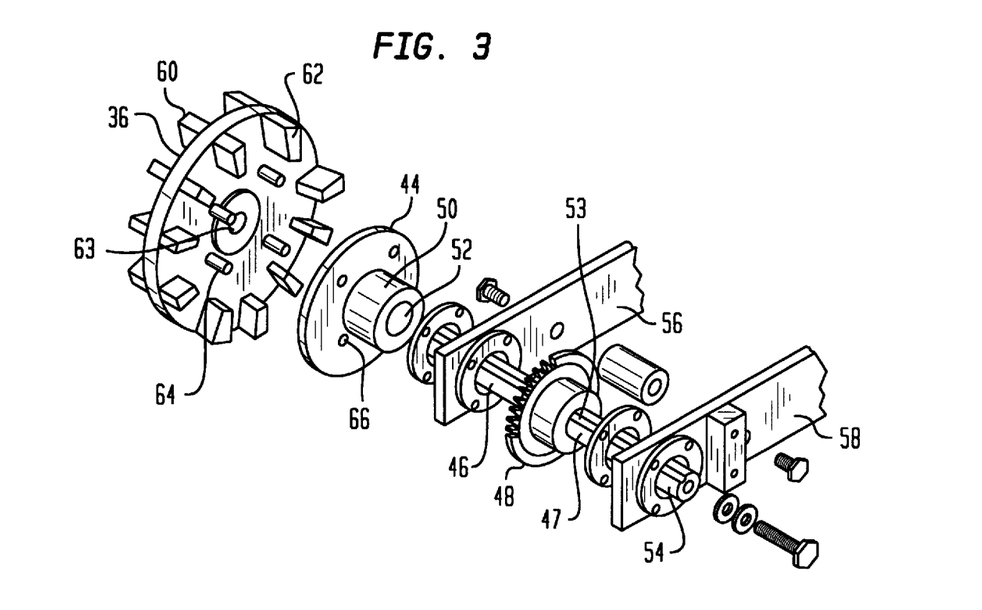
FIG. 3 is an exploded view of the driver wheel assembly used in conjunction with the present invention.

A further detail of the driver wheel arrangement and telescoping assembly is illustrated in FIG. 3. The driver wheel 36 includes a plurality of flanges 60 on one side, and a corresponding plurality of flanges 62 on the other side. The flanges are sized and spaced so at to match and mesh with the tabs on the inside of the snowmobile track. The driver wheel 36 also includes a bearing surface 63 which supports the driver wheel 36 when it is installed on the tension idler wheel axle of the snowmobile. To provide for power coupling take off, the driver wheel 36 has a plurality of pins 64 which engage a coupler plate 44 through corresponding holes 66. Coupler 44 also includes a collar 50 which accepts one end of a drive shaft 47 in opening 52.

The function of the driver wheel 36 is to engage the inside of the snowmobile track in the place where the removed tension idler wheels was normally located. The function of the telescoping assembly is to retract the driver wheels so that the snowmobile may be placed into position to receive the driver wheels, and to advance the driver wheels to engage the snowmobile.

The telescoping assembly consists of a drive shaft 47 and a sprocket wheel 48, supported by two bearing members 56 and 58 which allows driver wheel 36 to rotate about the axis of the drive shaft 47, and to slide longitudinally along the axis of the drive shaft 47. In particular, drive shaft 47 has a distal end 46 slideably mounted through bearing member 56, and a proximal end 54 slideably mounted through bearing member 58. At the distal end 46, drive shaft 47 is fastened to coupler 44 via collar 50 in opening 52, such as by a set screw. Sprocket wheel 48 is also slideably mounted on drive shaft 47. However sprocket wheel 48 and drive shaft 47 are keyed together 53 so that the sprocket wheel 48 and drive shaft 47 rotate together. That is, the key 53 in sprocket wheel 48 prevents it from rotating with respect to drive shaft 47, but allows it to slide relative to drive shaft 47.

The telescoping assembly permits driver wheel 36 to be extended and retracted by sliding drive shaft 47 back and forth through supporting bearings 56, 58 and sprocket wheel 48. The telescoping assembly further permits driver wheel 36 to cause sprocket wheel 48 to rotate and transmit power to a chain (not shown in FIG. 3) that fits over sprocket wheel 48. (A corresponding chain 401 is shown in FIGS. 4 and 5).

The telescoping assembly of FIG. 3 is a representative mechanism for positioning driver wheel 36 to couple power from the snowmobile track. Alternative mechanisms for placing the driver wheel 36 into position in lieu of a removed tension idler wheel, include the use of slideably mounted concentric cylinders, or any other mechanism for extending the driver wheels into position, including movement of the swing arms 26A, 26B.

Figure 4:
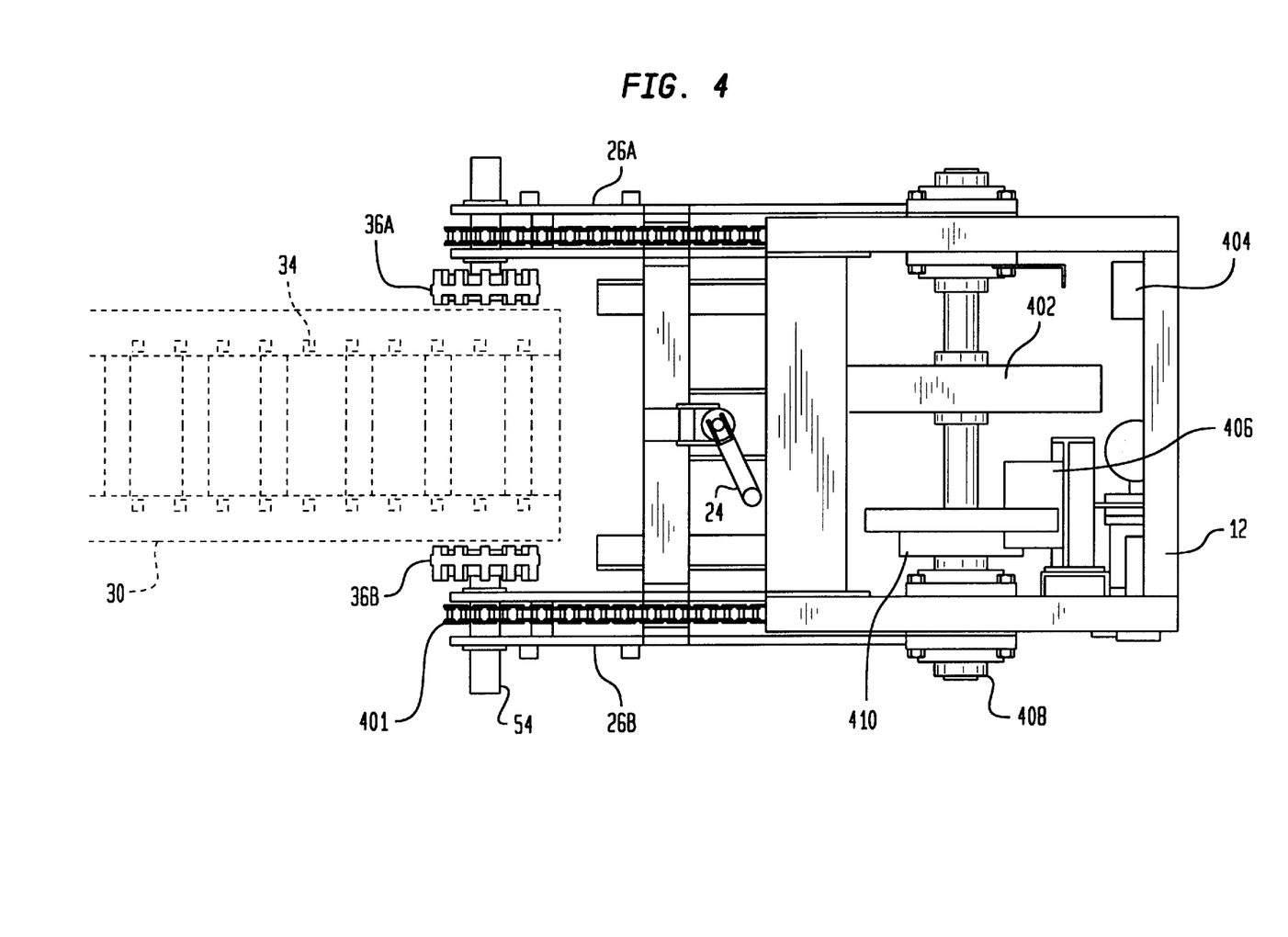
FIG. 4 is an overhead cutaway view of the dynamometer of the present invention with driver wheels in position to be coupled to the snowmobile under test.
Figure 5:
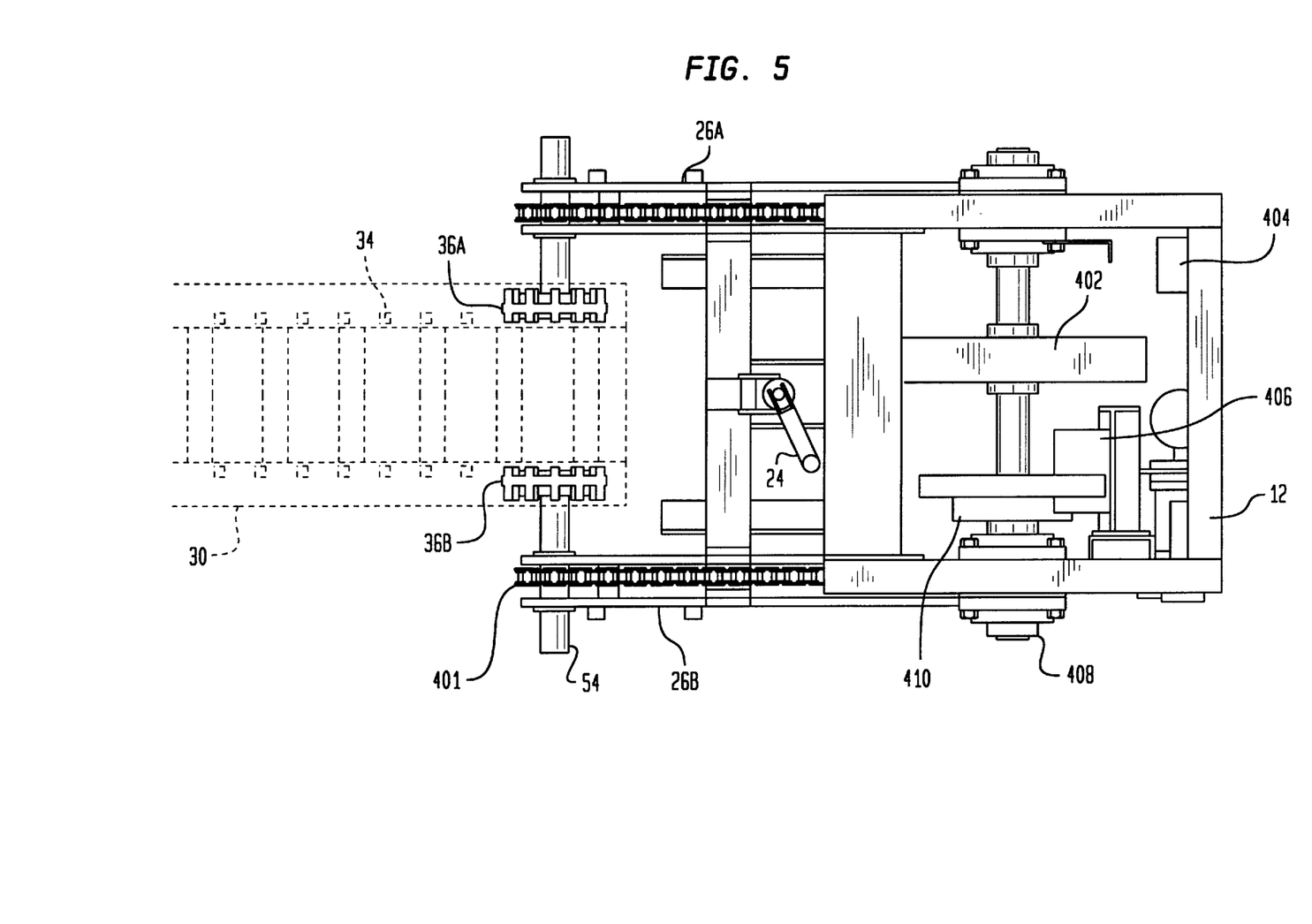
FIG. 5 is an overhead cutaway view of the dynamometer of the present invention with driver wheels coupled to the snowmobile under test.

FIGS. 4 and 5 illustrate the internal arrangement of dynamometer components and how the telescoping assembly and driver wheel engage the snowmobile under test. In particular, the housing 12 contains the dynamometer components comprising an inertia mass 402 (a flywheel) supported by bearings 408, and a caliper brake assembly 406 to slow the inertia mass 402 rotation. The driver wheel 36B is coupled to a sprocket wheel on one end of shaft 54. Another sprocket wheel is located at the flywheel bearing 408. A chain drive 401 connects the two sprocket wheels. Thus, the sprocket and chain drive arrangement 401 couples the driver wheel 36B to the inertia mass 402. An electronics interface 404 is coupled to sensors (not shown) and to a computing element (not shown) such as a laptop computer.

To attach the dynamometer, the snowmobile is placed on a horizontal floor. The regular tension idler wheels on each side of the snowmobile are removed. Driver wheels 36A, 36B on the dynamometer are moved to a retracted position as shown in FIG. 4. Then, the dynamometer is moved so that the swing arms 26A, 26B are on each side of the snowmobile, and the driver wheels 36A and 36B are positioned on each side of the snowmobile track 30 facing the tension idler wheel axle. To engage the snowmobile, driver wheels 36A and 36B are moved towards the snowmobile via the telescoping assembly to engage the inside of the track 30 by the internal tabs 34. When engaged, the track of the snowmobile is coupled to the inertia mass 402 via a drive chain 401, which runs around corresponding sprocket wheels at the telescoping assembly at one end, and the flywheel bearing 408 at the other end.

To measure horsepower and torque, the defined mass 402 is accelerated by the vehicle being tested, a snowmobile in this instance. The defined mass, inside the dynamometer housing 12, accelerates proportionally to the acceleration of the machine that is turning it (a snowmobile in this case). By measuring the rate of rotational acceleration of the known mass 402, the horsepower and torque characteristics of the tested snowmobile is calculated by engineering formulas well known to those skilled in the art.

In normal operation of the snowmobile, the tension idler wheel maintains proper track tension. During dynamometer test the driver wheel maintains proper track tension. In this sense, the driver wheel is somewhat similar to the tension idler wheel it replaces. The primary difference is that the driver wheel is designed for power take off from the inside of the track, which can be coupled to the inertia mass of the dynamometer. In an alternative embodiment, the tension idler wheel may be specifically designed (or subsequently modified) for power take off by including a coupling mechanism. For example in FIG. 3, the pins 64 could be added to the existing snowmobile idler wheel construction. Also, a coupling mechanism could be made part of the original tension idler wheel. Then, coupler 44 would form a quick connect and disconnect mechanism for coupling the dynamometer to the snowmobile. In another alternative embodiment, a coupling mechanism may be specifically designed to contact an existing tension idler wheel without modification of the tension idler wheel. In all of these cases, the dynamometer is attached to the snowmobile without having to remove and replace the tension idler wheels with a different pair of driver wheels.

The snowmobile dynamometer interface procedure in the general case is as follows:

1. Loosen snowmobile track tension adjuster bolts on both right and left side
2. Remove both snowmobile rear idler wheels
3. If necessary, remove track adjuster to allow proper clearance for moving parts
4. Install dynamometer rear driver wheels
5. Adjust track tension to manufacturer's specifications
6. If necessary, add supplementary tension to longer tracks
7. Position snowmobile dynamometer at the rear of snowmobile
8. Use swing arm jack to position the dynamometer coupling shaft and snowmobile rear idlers vertically in line
9. Position dynamometer to line up horizontally the dynamometer coupling shaft and snowmobile rear wheels
10. Connect dynamometer coupling shaft and snowmobile rear idler wheels
11. Use swing arm jack to elevate the snowmobile until there is adequate clearance between the ground and moving track (3.0–3.5 inches)
12. Verify that all moving parts of the snowmobile and dynamometer are clear of any foreign objects (i.e., tools and parts)
13. Stand clear of the track and moving dynamometer parts at all times
14. Start snowmobile
15. Accelerate track to a very slow speed to verify proper track alignment and tension
16. Attach dynamometer electronics
17. Verify proper functioning of dynamometer braking device
18. Warm up the snowmobile engine 19. Begin making dynamometer runs with snowmobile
20. Start sample button
21. Open full throttle and hold until snowmobile clutches have completed shifting sequences
22. Press sample button to end sample routine

What is claimed is:

1. A method for attaching a dynamometer to a snowmobile, said dynamometer having an inertia mass, and said snowmobile having a track, said method comprising:

contacting the inside of said track; and coupling power from the inside of said track to said inertia mass.

2. A method in accordance with claim 1, wherein said snowmobile further includes an idler tension wheel in contact with the inside of said track, said idler tension wheel rotating on an idler tension wheel axle, wherein said step of contacting the inside of said track comprises:

removing said tension idler wheel to expose said tension idler wheel axle;

placing a drive wheel on said exposed idler wheel axle; and coupling said drive wheel to said inertia mass.

3. A method in accordance with claim 1, wherein said snowmobile is disposed on a ground surface, said method further comprising:

applying a force between said ground surface below said snowmobile and said tension idler wheel axle to raise said snowmobile above the ground surface.

4. An apparatus for attaching a dynamometer to a snowmobile, said dynamometer having an inertia mass, and said snowmobile having a track, said apparatus comprising:

means for contacting the inside of said track; and means for coupling power from the inside of said track to said inertia mass.

5. An apparatus in accordance with claim 4, wherein said snowmobile further includes an idler tension wheel in contact with the inside of said track, said idler tension wheel rotating on an idler tension wheel axle, wherein said means for contacting the inside of said track comprises:

means for removing said tension idler wheel to expose said tension idler wheel axle;

means for placing a drive wheel on said exposed idler wheel axle; and means for coupling said drive wheel to said inertia mass.

6. An apparatus in accordance with claim 4, wherein said snowmobile is disposed on a ground surface, said apparatus further comprising:

means for applying a force between said ground surface below said snowmobile and said tension idler wheel axle to raise said snowmobile above the ground surface.

7. A dynamometer for attachment to a snowmobile, where said snowmobile has a track comprising a plurality of paddles on the outside surface and a plurality of tabs on the inside surface thereof, said snowmobile dynamometer comprising:

a driver wheel with flanges, wherein said flanges are positioned along said driver wheel so as to match and mesh with at least a portion of said snowmobile track;

a driver shaft coupled to said driver wheel; and an inertia mass coupled to said driver shaft.

8. A snowmobile dynamometer in accordance with claim 7, wherein said flanges correspond to said plurality of tabs on the inside of said snowmobile track.

9. A snowmobile dynamometer in accordance with claim 7, wherein said snowmobile is resting on a floor, and said snowmobile includes tension idler wheels rotating on a tension idler wheel axle, said snowmobile dynamometer further including a jack for lifting said snowmobile from said floor, said jack comprising:

a lifting mechanism providing an extension force; and a coupling mechanism for coupling said extension force between said floor beneath said snowmobile and said tension idler wheel axle.

10. A dynamometer for attachment to a snowmobile, where said snowmobile has a track comprising a plurality of paddles on the outside surface and a plurality of tabs on the inside surface thereof, said snowmobile including tension idler wheels rotating on a tension idler wheel axle, said snowmobile dynamometer comprising:

a coupler connecting to at least one of said tension idler wheels;

a drive shaft connected to said coupler; and an inertia mass coupled to said drive shaft.

11. A snowmobile dynamometer in accordance with claim 10, wherein said snowmobile is resting on a floor and said snowmobile dynamometer further includes a jack for lifting said snowmobile from said floor, said jack comprising:

a lifting mechanism providing an extension force; and a coupling mechanism for coupling said extension force between said floor beneath said snowmobile and said tension idler wheel axle.

* * * * *